United States Patent [19]

Brooks et al.

[11] Patent Number: 4,681,717
[45] Date of Patent: Jul. 21, 1987

[54] PROCESS FOR THE CHEMICAL PREPARATION OF HIGH-FIELD ZNO VARISTORS

[75] Inventors: Robert A. Brooks, Tijeras; Robert G. Dosch; Bruce A. Tuttle, both of Albuquerque, all of N. Mex.

[73] Assignee: The United States of America as represented by the United States Department of Energy, Washington, D.C.

[21] Appl. No.: 830,812

[22] Filed: Feb. 19, 1986

[51] Int. Cl.$^4$ .......................... C04B 33/34; H01B 1/06
[52] U.S. Cl. .......................................... 264/61; 264/66; 252/518; 252/519
[58] Field of Search ....................... 264/61, 63, 65, 66; 29/610 R; 252/518, 519; 338/20, 21; 419/49, 53, 54, 55, 30, 31; 423/593, 594, 622

[56] References Cited

U.S. PATENT DOCUMENTS 4,540,971  9/1985  Kanai et al. .......................... 252/518
4,575,440  3/1986  Palilla .................................. 252/518

Primary Examiner—Josephine L. Barr
Attorney, Agent, or Firm—Armand McMillan; Judson R. Hightower

[57] ABSTRACT

Chemical preparation techniques involving co-precipitation of metals are used to provide micro-structural characteristics necessary in order to produce ZnO varistors and their precursors for high field applications. The varistors produced have homogeneous and/or uniform dopant distributions and a submicron average grain size with a narrow size distribution. Precursor powders are prepared via chemical precipitation techniques and varistors made by sintering uniaxially and/or isostatically pressed pellets. Using these methods, varistors were made which were suitable for high-power applications, having values of breakdown field, $E_B$, in the 10–100 kV/cm range, $\alpha > 30$ and densities in the range of 65–99% of theoretical, depending on both composition and sintering temperature.

6 Claims, No Drawings

PROCESS FOR THE CHEMICAL PREPARATION OF HIGH-FIELD ZNO VARISTORS

The U.S. Government has rights in this invention pursuant to Contract No. DE-AC04-76DP00789 between the U.S. Department of Energy and AT&T Technologies, Inc.

BACKGROUND OF THE INVENTION

Zinc oxide varistors are polycrystalline ceramics which exhibit highly nonlinear current-voltage characteristics. Varistors are used in television sets and other home appliances to protect them from damage due to power surges. However, the most common use is to protect high power transmission lines. Varistors function as insulators below a certain characteristic voltage, termed "switching" or "breakdown" voltage; they allow only small amounts of current to flow. At voltages greater than this characteristic value, the varistor becomes conductive and voltage across the varistor remains at the characteristic value while current flow increases. The varistor properties of ZnO-based ceramics, expressed as $J=(E/K)^\alpha$ where J is the current density thru the varistor, E is the field across the varistor, K is a constant, and $\alpha$ is the nonlinearity coefficient, were first reported by Matsuoka, et al., *Jap. J. Appl. Phys.* 10(6), 737–46, 1971. The breakdown field is commonly denoted as $E_B$. Commercialization has led to considerable effort in improving varistor properties such as $\alpha$ and stability and in obtaining a basic understanding of varistor phenomena.

It is generally believed that the field developed across a varistor is related to insulating properties of grain boundaries and that the voltage drop across a single grain boundary is on the order of 3 volts. It is known that these grain boundary effects can be modified by the presence of chemical additives. The addition of $Bi_2O_3$ to polycrystalline ZnO, for example, increases the low voltage resistivity and also acts as a sintering aid, presumably due to the formation of a $ZnO-Bi_2O_3$ eutectic [W. G. Morris, "Physical Properties of the Electrical Barriers in Varistors", *J. Vac. Sci. Technol.* 13(4), 926–31 (1976); J. Wong, "Sintering and Varistor Characteristics of $ZnO-Bi_2O_3$ Ceramics", *J. Appl. Phys.* 51(8), 4453–9 (1980); E. M. Levin and R. S. Roth, "Polymorphism of Bismuth Sesquioxides: II", *J. Research Natl. Bur. Stand.*, Section A, 68(2), 197–206 (1964), which disclosures are incorporated by reference herein.] Since $Bi_2O_3$ is essentially insoluble in ZnO, it segregates either at grain boundaries or in second phases at grain boundary junctions: [W. D. Kingery, J. B. VanderSande, and T. Mitamura, "A Scanning Transmission Electron Microscopy Investigation of Grain Boundaries in $ZnO-Bi_2O_3$ Varistor", *J. Amer. Ceram. Soc.-Disc. and Notes,* 62(34), 221 (1979); D. R. Clarke, "Grain Boundary Segregation in a Commercial ZnO-based Varistor", *J. Appl. Phys.*, 50(11), 6829–32 (1979); L. M. Levinson and H. R. Philipp. "The Physics of Metal Oxides Varistors", *J. Appl. Phys.* 46, 1332 (1975); D. R. Clarke, "The Microstructural Location of the Intergranular Metal-Oxide Phase in a Zinc Oxide Varistor", *J. Appl. Phys.* 49, 2407 (1978).] Because of the former location, it is thought to contribute to the large electrostatic barriers which form at the grain boundaries [Pike, *Mat. Res. Soc. Proc.,* (5) 369 (1982)]. Other dopants, such as Co and Mn oxides, are used to enhance specific electrical properties such as increasing nonlinearity coefficients [Miyoshi, et al., *Ad. Ceram.,* Vol. 1, 309–15 (1981)], which disclosure is being incorporated by reference herein. These dopants are generally reported to be homogeneously distributed in ZnO grains [P. Williams, D. L. Kirvanek, G. Thomas and M. Yodogawa, "Micro-structure-Property Relationships of Rare Earth-ZnO Varistors", *J. Appl. Phys.* 51(7), 3930–4 (1980); L. J. Bowen and F. J. Avella, "Microstructure, Electrical Properties, and Failure Prediction in Low Clamping Voltage Znc Oxide Varistors", *J. Appl. Phys.* 54(5), 2764–72 (1983)]. Doped ZnO varistors have been reported as showing average voltage drops per grain boundary in the range of 2–4 volts when operating in the nonlinear regime [J. T. C. van Kemednade and R. K. Eijnthoven, "Direct Determination of Barrier Voltage in ZnO Varistors", *Ber. Dtsch. Keram. Ges.* 55(6), 330 (1978); P. R. Emtage, "The Physics of Zinc Oxide Varistors", *J. Appl. Phys.* 48(10), 4372 (1977)]. Typical doped ZnO varistors are described in Wong, "Sintering and Varistor Characteristics of $ZnO-Bi_2O_3$ Ceramics", *J. Appl. Phys.* 51(8), Aug. 1980, which disclosure is incorporated by reference herein.

Commercially available ZnO varistors are typically intended to operate in the nonlinear current-voltage regime with relatively low applied electric fields. They are prepared using conventional ceramic techniques which rely on mechanical mixing of oxide components for homogeneity and require high sintering temperatures (1000°–1300° C.) for densification. These varistors are thus limited to relatively low voltage applications due to compositional and microstructural heterogeneity and to large average grain sizes (>3 $\mu$M) caused by exaggerated grain growth during high temperature sintering. Low field strength <5 kV/cm and $\alpha$ values in the 30–50 range typically result. Accordingly, the varistors so produced are not suitable for applications in which high field strength (>5 kV/cm) is desirable. The highest field strength available in a custom designed varistor is in the range of 40–45 kV/cm and is believed to be unique to a single manufacturer.

U.S. Pat. No. 4,297,250 to Gupta, et al., which disclosure is being incorporated by reference herein, discloses the production of ZnO powders for use as variable (non-linear) resistors. The process involves mixing up to 98 mole% ZnO with up to 25 mole% (preferably 4–8%) of other metal oxides such as $Bi_2O_3$, $MnO_2$, CoO and the like, in an aqueous solution with an organic binder. The mixture is dried, pressed, sintered, then crushed to produce a powder.

U.S. Pat. No. 4,180,483 to Hoe, et al., which disclosure is being incorporated by reference herein, discloses a zinc oxide powder for use in non-linear resistors. The powder is produced by adding a mixed oxide glass powder (containing $Bi_2O_3$ and other metal oxides) to ZnO powder, then heating and pressing the result to form a ceramic body. This body is then annealed to produce the final product.

U.S. Pat. No. 4,243,622 to Kresge, which disclosure is being incorporated by reference herein, discloses the production of zinc oxide varistors through mixing and blending zinc oxide and other metal oxides, formed by sintering. The resulting composition is primarily zinc oxide, with small amounts of other oxides including $Bi_2O_3$, CoO and $MnO_2$.

U.S. Pat. No. 4,285,839 to Wong, which disclosure is being incorporated by reference herein, discloses the production of varistors and varistor powders primarily of zinc oxide by predoping the zinc oxide with aluminum nitrate in solution. The zinc oxide powder is added to the $AlNO_3$ solution, then heated, followed by the addition of other metal oxides. The final powder is sintered at 900°–1000° C.

U.S. Pat. No. 4,405,508 to Eckel, which disclosure is being incorporated by reference herein, discloses the production of zinc oxide varistor materials by combining zinc oxide, bismuth oxide and antimony oxide to form a $Bi_6Zn_4Sb_2O_{18}$ pyrochlore, then grinding this compound while adding other oxides such as cobalt oxide or manganese oxide. The resulting materials are pressed and sintered at 1150° C. to obtain the varistor.

Lauf, et al., have recently reported using chemical preparation techniques to prepare individual oxide compositions of ZnO-based varistors and using the individual components to prepare varistors by conventional oxide mixing techniques with densification done by hot pressing. Lauf, et al., "Fabrication of High-Field Zinc Oxide Varistors by Sol-Gel Processing," *Am. Ceram. Soc. Bull.*, 63(2), 270–81 (1984). By subsequent heat treatments in oxidizing atmospheres, they have produced materials with 3–6 $\mu M$ grain size and field strengths of 10 kV/cm at $10^{-4}$ A/cm$^2$ and $\alpha = 30(10^{-5}$ to $10^{-4}$ A/cm$^2$). Assuming $\alpha = 30$ from $10^{-5}$ to 5 A/cm$^2$, a field strength of 14.3 kV/cm would be measured at 5 A/cm$^2$.

In Wong, U.S. Pat. No. 4,142,996, which disclosure is being incorporated by reference herein, a fused salt method is used instead of mechanical mixing in an effort to obtain homogeneous varistor powders. Zinc and other metal nitrates were heated to form a hydrated melt which is further heated to dehydrate the melt, followed by still further heating at 600°–800° C. to convert the salts to oxides. The oxides are then sintered at 1300° C. producing varistors with breakdown fields of 1.6–2.3 kV/cm.

A brief comparison of these processes and that of the invention as described below is summarized in the following chart:

|  | Powder Prep | Sintering Temperature | Average Grain Size | Breakdown Voltage |
| --- | --- | --- | --- | --- |
| Cited Patents | Mixed oxide Fused salts | 1000–1300° C. | >5 $\mu M$ | <5 kV/cm |
| Invention | Co-precipitation | 675–740° C. | <1 $\mu M$ | 30–100 kV/cm |

SUMMARY OF THE INVENTION

It is an object of the invention to produce precursors for varistors having high fields of at least 30 kV/cm and $\alpha > 21$ at current densities of 5 A/cm$^2$.

It is a further object to provide such precursors enabling a greater than 90% densification during sintering at relatively low temperatures, in order to minimize changes in electrical properties by reducing introduction of contaminants in subsequent processing.

It is a still further object to produce varistors from the precursors having the above properties.

Upon further study of the specification and appended claims, further objects and advantages of this invention will become apparent to those skilled in the art.

These objects have been accomplished by applying chemical preparation techniques, particularly co-precipitation, to the preparation of precursor materials which, when sintered, produce varistors with uniform, submicron grains. In the process described herein, chemical preparation techniques were used to prepare complete varistor precursors, thus eliminating conventional oxide mixing techniques and resulting in varistors having densities of about 65–99% of theoretical and field strengths up to 100 kV/cm with $\alpha$ values typically greater than 30.

Assuming that the grain boundary properties which result in the 2–4 volt drop reported for commercial varistors would be partially dependent on grain size and on variations in grain size, it is apparent that a precursor material with a uniform and submicron grain size is needed to provide varistors with high breakdown value. Chemical preparation techniques provide homogeneity and typically allow for lower sintering temperatures, thus minimizing grain growth.

Varistors produced according to the invention are suitable for use in applications requiring high field strength such as over-voltage protectors in weapon systems.

DETAILED DISCUSSION

The processes of the invention are equally applicable to all conventional zinc oxide varistor compositions. However, in some cases higher sintering temperatures may be required. See the references cited herein, all of which disclosures are entirely incorporated by reference herein, as noted above, for typical compositions. Components are contained in starting material solutions in the proportion in which they are desired in the precursor products, in both processes detailed below.

Preferred precursor compositions comprise 93–98.5 mole% ZnO, doped with 0.01–1.2 mole% MnO, 0.01–1.0 mole% CoO, or with 0.005–0.5 mole% MnO plus 0.005–0.5 mole% CoO, all varistors also being doped with 0.1–6.0 mole% $Bi_2O_3$. Varistors produced from the precursors herein retain the starting material proportions of components, within analytical measurement techniques.

In this embodiment of the invention, the predetermined relative amounts of chlorides of desired varistor components, preferably Zn, Co, and/or Mn, are dissolved in $H_2O$. Preferably, they are co-precipitated as hydroxides. Chlorides are preferred, although varistors were also made from nitrates, acetates and sulfates. See Dosch, et al., Sandia Report No. SAND-85-0195 (Sept. 1985) detailing production of varistors according to the invention, which entire disclosure is hereby incorporated by reference.

The concentrations of the various salts in the precipitation solution are selected such that a minimum volume of solution is obtained. Precipitation is effected by the addition of an alkali metal hydroxide to the salt soltion, preferably by the addition of NaOH or $NH_4OH$, more preferably by the addition of NaOH. Precipitation is essentially immediate.

The hydroxides are preferably converted to oxalates, by the addition of oxalic acid. Preferably an amount of acid within about 2 mole% of the amount of NaOH is used, in order to prevent changes in oxide morphology. More preferably, oxalic acid is added in stoichiometric amount in relation to Zn, Mn and Co present. The oxalates retain the hydroxide morphology but are more easily filtered and purified by washing.

If oxalates are to be obtained, the hydroxide precipitate may be aged in the solution before oxalic acid is added. Aging of the hydroxides tends to lower $E_B$, and aging times of 10 minutes or less are preferred. An aging time of two minutes is particularly preferred.

Conversion to oxalates is exothermic. It is preferred to allow the oxalate solution to react and cool with stirring in an ambient temperature environment before filtration, until the solution temperature reaches about 40° C.

The precipitate is conventionally filtered and washed, preferably with deionized water followed by acetone. The acetone wash tends to prevent agglomeration of the precipitate. The precipitate is preferably washed 3 times with water followed by acetone, with about a filter bed-volume of each being used in each wash.

The filtered precipitate is then dried, preferably at ambient temperature and low vacuum for 12-24 hours.

After washing and drying, the mixed hydroxides or oxalates are converted to oxides by calcining, preferably at 400°-800° C. Preferably, the hydroxides or oxalates are heated from ambient temperature to about 300° C. over 4 hours then to 400° C. over 12 hours, maintained at 400° C. for 4 hours then heated to 600° C. over 2 hours. The temperature is preferably maintained at 600° C. for 2 hours and the resultant oxides are allowed to cool at a rate limited by the thermal mass of the furnace.

Bismuth may be precipitated on the surface of the mixed oxides by hydrolysis, preferably by contacting the oxides with a solution of Bi metal dissolved in $HNO_3$.

Bismuth oxide is heterogeneously distributed at grain boundaries and grain boundary junctions. Bi doping procedures microstructural uniformity and sub-micron grain size by coating individual particles in the precursor powders with Bi oxide and also lowers sintering temperatures, thus minimizing grain growth. Phenomenologically, the Bi doping step appears to be a metathetical reaction where Bi replaces Zn, Co, and/or Mn. However, the actual chemistry involved is probably a hydrolysis reaction where dissolution of Zn, Co, or Mn oxides consumes $HNO_3$ resulting in a high, localized pH at the powder surface, resulting in precipitation of hydrated Bi compounds on the surface of the oxide powder.

The amount of Bi is chosen based on the amount of oxide materials recovered in the previous step in order to achieve the desired molar concentration of bismuth. Bi metal is dissolved in an amount of concentrated $HNO_3$ sufficient to solvate the predetermined amount of metal while maintaining the minimum volume of liquid.

The solution is then filtered to obtain the solids component. The oxides are in the form of a free-flowing powder. It is desirable to break up any large agglomerates that may be present.

The oxides are then dried, preferably at 400° C. More preferably, the oxides are heated from ambient temperature to about 400° C. over 2 hours, and maintained at that temperature for about 2 hours.

After drying, the resulting varistor precursor is uniaxially cold-pressed at 2000 to 12,000 psi and/or isostatically pressed at 10-30k pi, and sintered. Sintering is preferably conducted in air or $O_2$-enriched air. Reducing conditions should be avoided. Sintering temperatures are from about 675°-740° C., preferably 700°-725° C. The cold-pressed oxides should be maintained at the sintering temperature for about 16 hours. The oxides may be brought to temperature over 4 hours, maintained for 16 hours, cooled to 400° C. at 0.5°-1.5° C. per minute and then allowed to cool naturally, or alternatively they may be placed in an oven preheated to sintering temperature, maintained for 16 hours and then quenched. Varistors are thereby produced with submicron average grain sizes and $E_B$ from about 30-100 kV/cm and $\alpha > 30$.

Certain conclusions may be drawn about varistors prepared by sintering the precursors prepared according to the invention as follows.

Both increasing sintering temperatures and the addition of MnO or MnO plus CoO generally promote densification. However, this is not true for varistors doped with CoO alone. Addition of 0.1 mole% CoO inhibits densification while other CoO concentrations—both higher and lower—either promote densification or have little apparent effect. However, there is no general trend relating densification to dopant concentration for any of the dopant combinations of this invention.

The amount of open porosity is related to densification and is of concern in the art as porosity can contribute to the introduction of impurities during subsequent processing. For a given set of sintering conditions, varistors doped with MnO typically have the least amount of open porosity. There is no apparent correlation of open porosity with MnO concentration holding over the entire range of sintering temperatures. This is also the case for varistors doped with CoO or CoO plus MnO.

Increasing sintering temperatures and the use of dopants in addition to $Bi_2O_3$ tend to decrease varistor breakdown fields ($E_B$). The addition of CoO and/or MnO tends to decrease $E_B$. At lower doping concentrations, the addition of CoO results in the greatest decreases in $E_B$. At the higher doping concentrations, there is no general trend relating $E_B$ and the particular dopant(s) used.

Non-linearity coefficients for $2.5 \leq J \leq 5.0$ A/cm$^2$ are much less dependent on sintering temperatures than is $E_B$. Only a slight trend toward decreasing $\alpha$ with increasing sintering temperature is observed. A general trend toward increasing $\alpha$ with increasing doping concentrations is also observed for CoO plus MnO-doped varistors.

Addition of CoO and/or MnO appears to enhance grain growth in the 675°-740° C. sintering range, the extent of which depends on the dopant used. However, average grain size (AGS) remained submicron for all compositions which were sintered in this temperature range. For a given additive(s), doping levels have a relatively limited influence on the AGS. MnO doped varistors increased approximately 20% in AGS over a ten-fold increase in MnO content, while doping level increases of CoO or CoO+MnO produce little or no changes in AGS.

The effects of different raw materials and precipitation times on varistor properties are also discussed in the preprint, Dosch, "The Effects of Processing Chemistry on Electrical Properties of High Field ZnO Varistors", *Proc. 2nd Int'l. Conf. on Ultrastructure Processing of Ceram., Glass and Composites*, Wiley & Sons, to be published shortly, which disclosure is being incorporated by reference herein.

Without further elaboration, it is believed that one skilled in the art can, using the preceding description, utilize the present invention to its fullest extent. The following preferred specific embodiments are, therefore, to be construed as merely illustrative, and not limitative of the remainder of the disclosure in any way whatsoever.

In the preceding text and the following examples, all temperatures are set forth uncorrected in degrees Celsius and all parts and percentages are by weight unless otherwise indicated.

times and the $E_B$ and $\alpha$ values reported typically represent the mean and standard deviation of 9 or more measurements. Test results are given in Table I. The electric field values tabulated were measured at 5A/cm$^2$.

TABLE I

Electrical and Physical Properties of Chemically Prepared ZnO—Based Varistors

| Example | Sintering Temp., °C./Time, hr/Atm. | Composition, Mole % CoO$_2$/MnO$_2$/Bi$_2$O$_3$ | % of Theor. Density | % Open Porosity | E,kV/cm | $\alpha$ |
|---------|------|------|------|------|------|------|
| 2 | 675/16/AIR | 1.0/0/0.56 | 68.3 | 31 | 94 | 49 |
| 3 | 700/6/AIR | 1.0/0/0.56 | 85.6 | 14 | 72 | 50 |
| 4 | 700/12/AIR | 1.0/0/0.56 | 83 | 9 | 71 | 36 |
| 5 | 700/16/AIR | 1.0/0/0.56 | 85.6 | 15 | 60 | 40 |
| 6 | 700/16/AIR-O$_2$ | 1.0/0/0.56 | 91.6 | 0.2 | 58 | 31 |

EXAMPLES

Fabrication of all varistors was done sintering uniaxially and/or isostatically cold-pressed pellets in air, or O$_2$ enriched air. Calcining typically produced free-flowing powders which were pelletized in the as-calcined condition. In some cases, powders contained large, loosely-bound agglomerates and were passed through a 45 mesh screen or ball-milled prior to pelletizing. Green pellets weighing 5 to 7 grams were pressed at 68.9 MPa (10,000 psi) in a 1¼" diameter die and sintered in the range of 675°–740° C. No binder materials or die lubricants were used in pelletizing the precursor oxides. Heating and cooling rates of 3° C./min and 0.5° C./min, respectively, were used during sintering. Cooling rates were not controlled at temperatures below 400° C.

EXAMPLE 1

A varistor with a nominal composition of 98.44 mole% ZnO, 1.0 mole% CoO, and 0.56 mole% Bi$_2$O$_3$ is prepared as follows: A mixture of 315 g ZnCl$_2$+5.58 g CoCl$_2$.6H$_2$O was dissolved in 2 liters of H$_2$O. 370.4 g of a 50.94 wt.% equivalent solution of NaOH was added. After stirring about 2 minutes, a solution of 292.4 g of H$_2$C$_2$O$_4$.2H$_2$O (100.65% assay) dissolved in one liter of H$_2$O using minimum heating was added followed by 45 minutes of stirring. After filtering and washing with water and acetone, the product was calcined at 600° C. Sixty grams of the calcined powder was contacted with a solution containing 1.734 g Bi dissolved in HNO$_3$ for a period of 30–60 minutes. After filtering and washing, the solids were dried at 400° C. Pellets were pressed at 10,000 psi using 6 g of powder in a 1¼" diam. die and fired in air or O$_2$-enriched air at 675°–700° C. for various periods of time as shown in Table I.

EXAMPLES 2–6

Varistors are prepared with compositions as indicated in Table I. The varistors were dry-polished to a 600 grit finish prior to electroding. Three circular electrodes with areas of 0.2 cm$^2$ or 0.32 cm$^2$ were applied to each varistor sample using Ag paint (DuPont conductor composition 4817). They were tested with current pulses approximately 12 µs in duration with a rise time of 1 µs between 10% and 90% amplitude levels. Voltages corresponding to the 2.5 and 5.0 A/cm$^2$ current pulses were read by a 2 channel, 9 bit digitizer. The voltage readings were taken at approximately 8 µs where voltage change with time was very small. Each electrode on a given varistor was tested three or more The preceding examples can be repeated with similar success by substituting the generically or specifically described reactants and/or operating conditions of this invention for those used in the preceding examples.

From the foregoing description, one skilled in the art can easily ascertain the essential characteristics of this invention, and without departing from the spirit and scope thereof, can make various changes and modifications of the invention to adapt it to various usages and conditions.

What is claimed is:

1. In a process for the production of a varistor precursor by intimate mixing of zinc oxide, bismuth oxide, and at least one additional metal oxide dopant, the improvement comprising:
   mixing the oxides by
   (a) precipitating zinc or coprecipitating zinc and at least one additional metal from a solution of chloride salts thereof by means of an inorganic hydroxide,
   (b) converting said precipitate to oxides by calcining at 400–600 degrees C., and
   (c) precipitating bismuth on the surface of said oxides by contacting with a solution of Bi dissolved in HNO$_3$;
   wherein said additional oxide dopant is MnO, CoO, or a mixture thereof, and wherein the proportions of oxides in said resulting precursor are about:
   93–98.5 mole% Zn
   0–1.0 mole% Co
   0–1.2 mole% Mn
   0.1–6.0 mole% Bi.

2. A process according to claim 1, wherein said calcined precursor is uniaxially and/or isostatically cold-pressed and sintered to produce a varistor.

3. A process according to claim 2, wherein said sintering is conducted at a temperature of about 675°–725° C. for periods in excess of four hours.

4. A process according to claim 1, said improvement further comprising co-precipitating zinc and said dopant from a solution by adding NaOH to produce hydroxides, and subsequently converting the hydroxides to oxalates by adding oxalic acid.

5. A process according to claim 2, wherein the resultant varistor has a submicron average grain size, and a nonlinearity coefficient ($\alpha$) of at least 30 for J=2.5–5.0 A/cm$^2$.

6. A process according to claim 1 wherein the inorganic hydroxide used is sodium hydroxide and the precipitate is further converted to oxalates by addition of oxalic acid before calcining.

* * * * *